March 31, 1931. R. H. TURNER 1,799,031
DISTRIBUTOR MECHANISM FOR TYPOGRAPHICAL MACHINES
Filed July 15, 1930 2 Sheets-Sheet 1
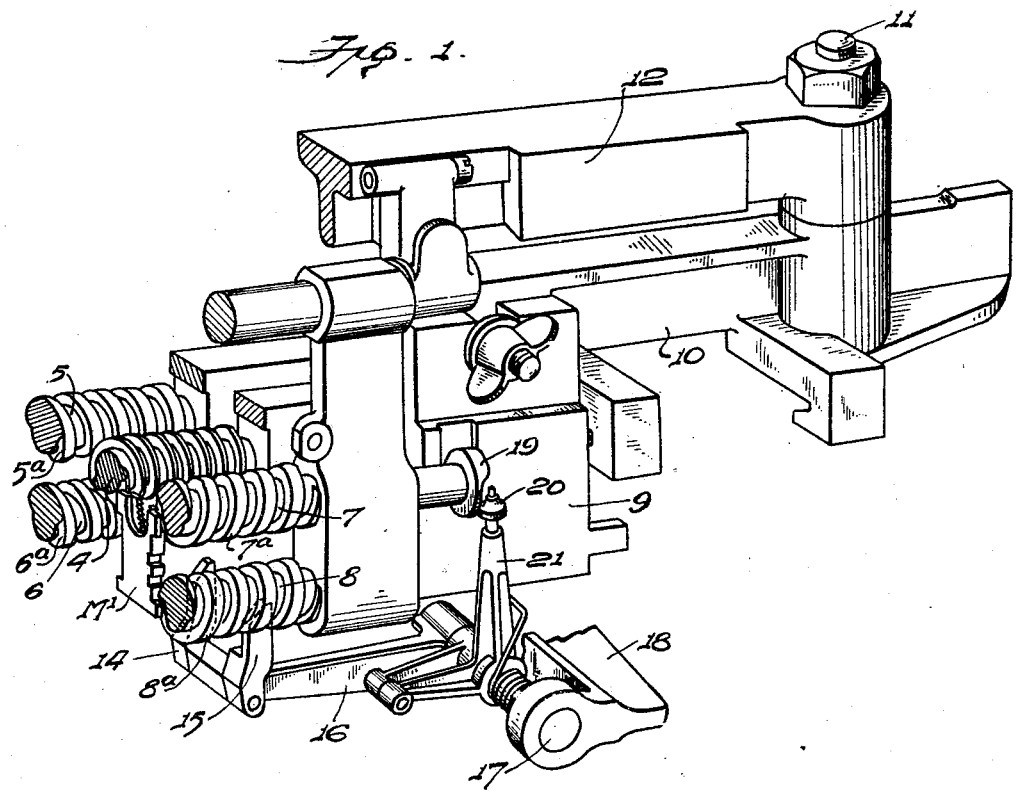
Ransom H. Turner
INVENTOR
BY
ATTORNEY March 31, 1931.  R. H. TURNER  1,799,031
DISTRIBUTOR MECHANISM FOR TYPOGRAPHICAL MACHINES
Filed July 15, 1930  2 Sheets-Sheet 2
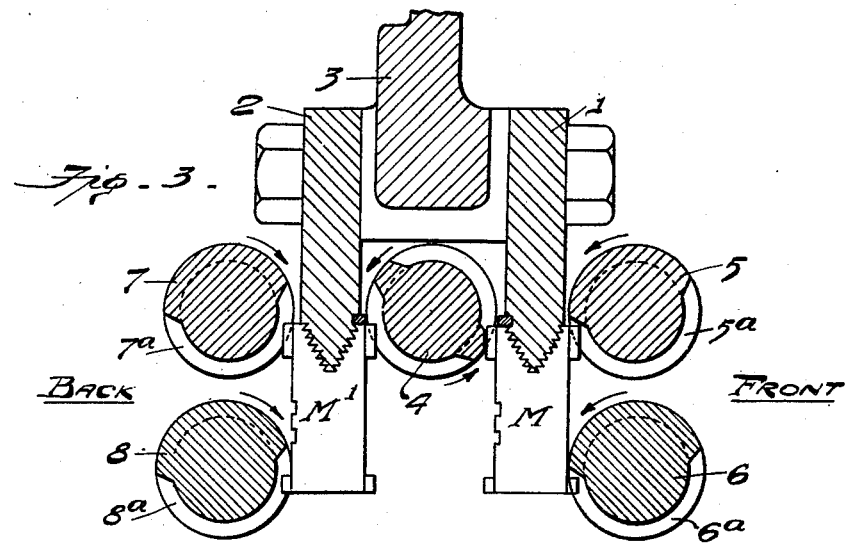
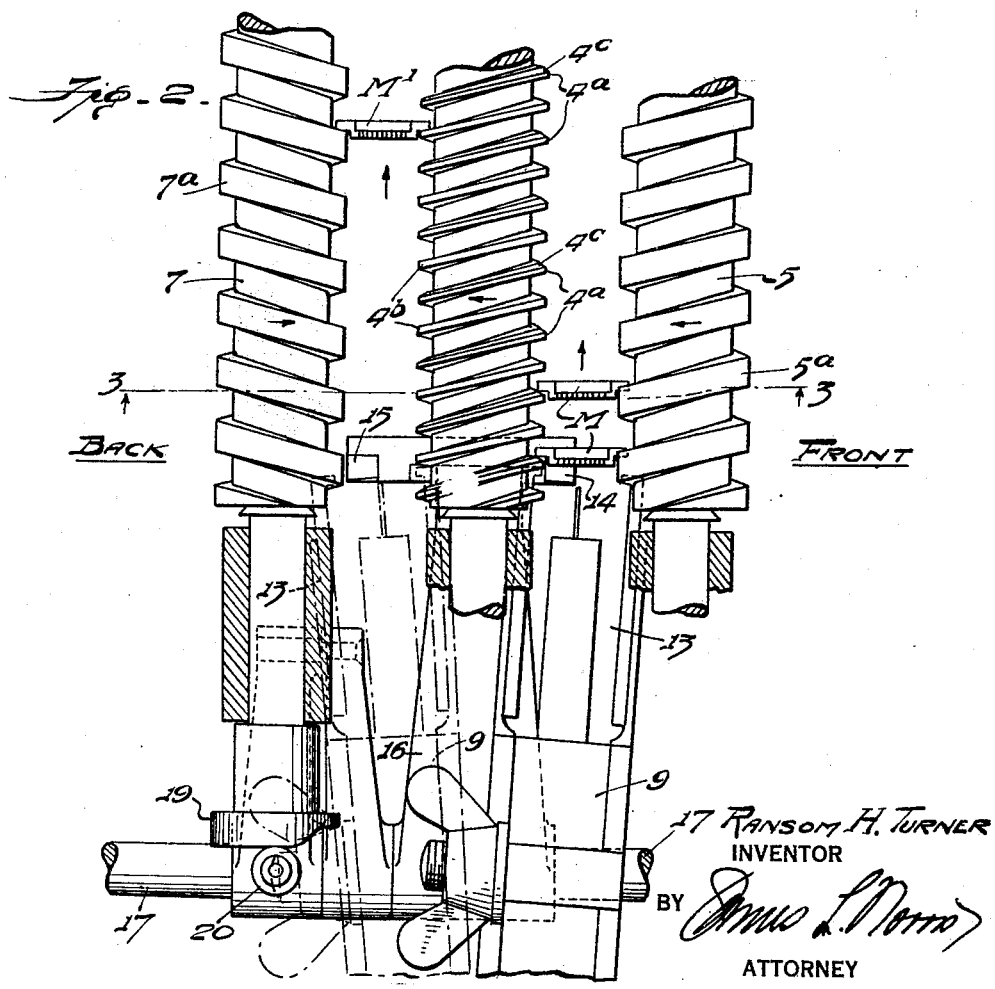
Ransom H. Turner
INVENTOR
BY
ATTORNEY Patented Mar. 31, 1931

1,799,031

UNITED STATES PATENT OFFICE

RANSOM H. TURNER, OF AUBURNDALE, NEW YORK, ASSIGNOR TO INTERTYPE CORPORATION, OF BROOKLYN, NEW YORK, A CORPORATION OF NEW YORK

DISTRIBUTOR MECHANISM FOR TYPOGRAPHICAL MACHINES

Application filed July 15, 1930. Serial No. 468,160.

The present invention relates to improvements in typographical machines of the general class shown and described in U. S. Letters Patent No. 436,532 granted September 16, 1890 to O. Mergenthaler, wherein matrices stored in a magazine or magazines are assembled in lines, together with spacers, and such lines are presented to a mold for the casting of type bars or slugs therefrom, after which the matrices used in such lines are returned to the magazine or magazines from which they were drawn, by distributing mechanism.

The invention relates more particularly to the matrix distributing mechanism of machines of that class, and especially to those of the so called "mixer" type examples of which are shown and described in U. S. Letters Patents Nos. 848,771 granted April 2, 1907 to J. R. Rogers and 1,202,719 granted Oct. 24, 1916 to T. S. Homans, wherein matrices used in composing the lines are drawn from one or another of a plurality of magazines containing matrices belonging to different fonts, so that the composed lines may contain matrices from different magazines, and the matrices used in such lines, after the casts have been made therefrom, are returned to their respective magazines by passing them through distributors arranged one next to the other and corresponding with the respective magazines.

In machines of the mixer class as generally constructed, the distributors have been arranged in a pair each having conveyer screws for advancing the matrices therethrough, and a center conveyer screw is used which is common to both distributors and cooperates with the conveyer screws therein to advance the matrices therethrough, the matrices being lifted into engagement with the conveyer screws in one or another of the distributors by a pair of lifting fingers reciprocating vertically in unison and at a uniform rate in relation to the rotation of the screws, but difficulties have been experienced in the use of such distributors due to the fact that while the thread at one side of the center screw may be in proper timed relation with the lifting finger for one distributor to properly engage the matrices therewith and with the conveyer screws in that distributor, the thread of the center screw at the opposite side thereof is out of timed relation with the lifting finger for the other distributor, in consequence of which striking of the matrices on the crests or threads of the conveyer screws in the latter distributor instead of entering the groove between the threads has resulted, causing damage to the matrices.

Efforts have been made to obviate these difficulties by cutting away the threads at the entrance or matrix receiving ends of the screws in one of the distributors so that the screws in this distributor will not obstruct the matrices, but such cutting away of the thread of the center screw produces a widened space at the rear side of the threads where the matrices enter and remain until the front face of the screw comes around to carry them away. The lead side of the screw thread, however, is not in time with the lifting finger which recedes immediately after lifting the matrix into the widened space at the rear so that the matrices are unsupported for a partial revolution of the screw and this allows them to swing and vibrate freely in the rails from which they temporarily hang and has resulted in the matrices becoming bent and twisted or otherwise damaged.

The object of the present invention is to provide a simple and improved construction and arrangement of the conveyer screws for distributors of this class whereby all of the difficulties heretofore experienced are avoided, the invention enabling the matrices to be lifted promptly and properly into engagement with the conveyer screws of the different distributors by the lifting fingers operating in unison, so that the matrices will be correctly engaged in the grooves between the threads of the screws without liability of damage to the matrices, and rendering it unnecessary to cut away or otherwise alter the threads at the entrance ends of any of the conveyor screws.

In the accompanying drawing:—

Fig. 1 is a perspective view of the matrix receiving end of matrix distributing mechanism for a typographical machine of the mixer type, embodying the present invention;

Fig. 2 is a top plan view, partly in section, of the distributing mechanism shown in Fig. 1; and Fig. 3 is a transverse vertical section taken on the line 3—3 of Fig. 2, this figure including the combination rails on which the matrices are suspended during their advance through the distributors.

Similar parts are designated by the same reference characters in the different figures.

The present invention is applicable generally to matrix-distributing mechanism of the class embodying a plurality of distributors, one arranged next to the other and having a matrix conveyer screw, common thereto, distributing mechanism of this class being for example used in machines of the mixer type, and the invention being shown in the present instance applied to distributing mechanism for machines of that type. It is to be understood, however, that the invention is not restricted to the precise construction or particular embodiment of the invention shown, as equivalent constructions are contemplated and such will be included within the scope of the claims.

In the present instance the distributing mechanism to which the present invention is shown applied is of the kind disclosed in the Homans patent hereinbefore referred to, to which reference is made for a detail explanation of the construction and mode of operation of such distributing mechanism. For the present purposes it is deemed sufficient to set forth that 1 and 2 are the combination bars or rails which are bolted or otherwise fixed to the distributor bracket 3 which forms part of the frame of the machine, these bars or rails being parallel and extending horizontally across the rear portion of the machine above the entrances to matrix magazines in superposed relation thereon and having the usual combination ribs on their lower edges to cooperate with teeth formed in the upper ends of the matrices in the usual manner so that matrices will be suspended from these bars or rails, during their advance through the distributors, until they reach the points where they are to drop from these bars to enter the channels in the magazines in which they belong, the matrices M belonging to one magazine being shown suspended from the bar 1 and the matrices M' belonging to the other magazine being shown suspended from the bar 2 in Fig. 3.

The matrices are advanced along these combination bars while suspended therefrom, by conveyer screws, a center screw 4 being usually provided which operates to advance matrices along both of the combination bars 1 and 2 in conjunction with upper and lower conveyer screws 5 and 6 which serve to advance matrices M along the combination bar 1 and upper and lower screws 7 and 8 which serve to advance matrices M' along the combination bar 2. In the present instance, the combination bar 1 is mounted in front of the combination bar 2, the bar 1 together with the screws 5 and 6 and the center screw 4 forming a front distributor and the combination bar 2 together with the screws 7 and 8 and the cooperating center screw 4 forming a rear distributor. The conveyer screws are all connected at their ends by gearing in the usual manner whereby these screws will all be driven continuously and at the same speed in the directions indicated by the arrows in Figs. 2 and 3.

In applying the invention to distributing mechanism of the kind shown in the Homans patent above referred to, the matrices are introduced into the front or rear distributor, according to the magazine in which they belong, by a distributor box 9 carried by an arm 10 which is mounted to swing on a vertical pivot 11 supported from a relatively fixed beam or bracket 12 so as to bring its matrix discharging end 13 into position to deliver matrices into either the front or the rear distributor as shown diagrammatically by the full and dotted lines in Fig. 2, it being understood that the distributor box receives each matrix line after a cast has been made therefrom, as is usual in machines of this class. The means for shifting the distributor box to introduce the matrices in the one or the other of the distributors according to the magazines in which the matrices belong, may be like that shown and described in the Homans patent above referred to.

The matrices are lifted from the distributor box into engagement with the combination bars 1 and 2 and the conveyer screws in the distributors by a pair of lifting fingers 14 and 15, these lifting fingers being below the combination bars 1 and 2 respectively at the entrance or matrix-receiving ends of the conveyer screws and at the matrix delivery end 13 of the distributor box when the latter is set to introduce matrices into one or the other distributor. These matrix lifting fingers reciprocate in unison vertically and in uniform timed relation to the rotation of the conveyer screws, they being shown in the present instance as mounted on the end of an arm 16 which is pivoted to rock on a shaft 17 mounted in a relatively fixed bracket 18, the arm 16 being lifted and lowered by a cam 19 which is mounted on the end of one of the conveyer screws and cooperates with a roller 20 carried by an arm 21, the latter being operatively connected to the arm 16 so that the lifting fingers 14 and 15 will be lifted and lowered during each revolution of the conveyer screws, the lifting fingers being located in directly opposite relationship so that they will lift the matrices into engagement with the conveyer screws in the different distributors at corresponding points in the length of the screws.

The conveyer screws 5 and 6 for the front distributor each have a single thread 5ª or 6ª thereon forming grooves between them to receive the lugs or ears on the upper and lower forward edge of the matrices M when the latter are lifted to engage the bar or rail 1, the threads 5ª and 6ª of these screws being right-handed so that rotation of these screws in the direction of the arrows will advance the matrices in this distributor in a direction away from the distributor box, and the screws 7 and 8 of the rear distributor each have a single thread 7ª or 8ª thereon, the threads on each of these screws forming grooves between them to receive the upper and lower lugs or ears on the rear edges of matrices M' when the latter are lifted to engage the rear bar or rail 2, the threads of these screws being left-handed so that rotation of these screws in the direction indicated by the arrows will act to advance matrices in the rear distributor in a direction away from the distributor box. The center screw 4, which is common to both distributors, engages the lugs or ears on the upper rear corners of matrices M in the front distributor in cooperation with the screws 5 and 6 to advance the matrices in that distributor and it engages the lugs or ears on the upper forward corners of the matrices M' in the rear distributor in cooperation with the screws 7 and 8 to advance the matrices in that distributor.

Heretofore, the center screw used in distributing mechanism of this kind has been provided with a single thread, like that on the screw 5, to engage the matrices in the front and rear distributors but it will be obvious that while such a thread on the center screw may be timed with the lifting finger of one distributor to properly receive the matrices as they are introduced into that distributor, such single thread on the center screw would be out of time with the directly opposite matrix lifting finger of the other distributor, since a single thread on the center screw is displaced axially at the front and rear sides thereof to the extent of one half the pitch of the thread. Efforts have been made to obviate this difficulty by cutting away the threads on the center screw and the cooperating screws of one of the distributors at the point in the length of the screws where the matrices are lifted to engaged them and thus avoid striking of the lugs of the matrices in that distributor against the outer edges or crests of the threads of the screws, but such efforts have not been satisfactory since the cut away portions of the threads of the screws allow the matrices after being lifted and before being engaged and advanced by the screws and while supported merely on rails, to become twisted or tilted, resulting in jamming or bending of the matrices.

The present invention avoids such difficulties and enables matrices to be correctly engaged with the screws of the distributor using a center screw common to both distributors and matrix lifting fingers operating in unison in both distributors. According to the present invention, the center screw 4 is provided with two threads 4ª and 4ᵇ respectively, these threads being of the same pitch as that of the rest of the distributor screws and being preferably spaced apart equidistantly, or substantially so, in the direction of the axis of the center screw so that the matrix receiving grooves between the threads will be of substantially equal width, and the threads on the center screw are preferably right-handed or correspond in their direction of pitch with those on the screws 5 and 6. By thus providing the center screw with double threads which may be of appropriately reduced thickness, the thread 4ᵇ lying about midway between the convolutions of the thread 4ª, the portions of the thread 4ª where they engage the matrices in the front distributor will be substantially directly opposite to the corresponding portions of the thread 5ª on the screw 5 and the portions of the thread 4ᵇ where they engage the matrices in the rear distributor will be substantially directly opposite to the corresponding portions of the thread 7ª on the screw 7, and the threads 4ª and 4ᵇ will be substantially directly opposite to one another at opposite sides of the center screw. The matrix lifting fingers and all of the screws are so timed that the matrices will be lifted into engagement with the screws in both distributors immediately in front of the threads of the screws so that the matrices introduced into both distributors will be promptly advanced by the screws therein before descent of the matrix lifters takes place, certainty in engagement of the matrices with the respective combination bars or rails being thus insured and twisting or jamming of the matrices being avoided, the matrices being advanced by the screws in the distributors while held in true perpendicular relation with the combination bars as will be understood from Fig. 2.

Since the center screw 4 and the rear screws 7 and 8 rotate in opposite directions, the threads of these screws will engage the upper lugs or ears of the matrices M' at the upper edges thereof, and since the front screws 5 and 6 rotate in the same direction with the center screw, the threads on the front screws 5 and 6 will also engage the upper edges of the lugs or ears of the matrices M, but the thread 4ª at the forward side of the center screw 4, if said thread were formed with a radially perpendicular side wall, would engage the upper rear lugs or ears of the matrices M about midway of the height thereof. Such engagement of the matrices by the screws in the front distributor would cause these matrices to occupy a twisted position on the combination bar but this could be avoided by appropriately timing the front screws 5 and 6 relatively to the center screw so that the matrices would be advanced while hanging squarely from the combination bar. However, such an arrangement would present the disadvantage that the matrices when dropping from the combination bar at their proper points to return to their respective channels of the magazine would not immediately clear the thread of the center screw but would receive a twisting impulse therefrom which would tend to interfere with its free descent into the magazine entrance. It is therefore preferable to cause the thread 4ª at the front of the center screw to engage the upper rear lugs or ears of the matrices M also at the upper ends thereof and thus insure even feeding of these matrices through the front distributor and allow direct dropping of these matrices from the combination bar without interference from this thread on the center screw, by forming the leading or matrix-engaging side of the thread 4ª on the center screw with a bevel 4ᶜ which is at such an angle radially of said thread that it will engage the upper ends of the upper rear lugs on the matrices in the front distributor.

In the operation of matrix distributing mechanism constructed as hereinbefore described the matrices are lifted into engagement with the conveyer screws and combination bars of the different distributors by the matrix lifting fingers 14 and 15, and the matrices are engaged and advanced immediately by the threads of the conveyer screws in the respective distributors, the matrices M being engaged by the threads 5ª and 6ª on the front distributor screws 5 and 6 and by the thread 4ª at the forward side of the center screw 4, and the matrices M' introduced into the rear distributor being engaged by the threads 7ª and 8ª on the rear screws 7 and 8 and by the thread 4ᵇ at the rear side of the center screw, the substantially directly opposite relationship of the matrix engaging portions of the threads 4ª and 4ᵇ at the front and rear sides of the center screw 4 and the timing of the threads of the front and rear distributor screws to correspond therewith insuring proper reception of the matrices in both distributors from the matrix-lifting fingers without the necessity of cutting away or otherwise altering the entrance or matrix-receiving ends of the threads of any of the screws and insuring the advance of the matrices in both distributors to their respective points of discharge therefrom while suspended squarely from the combination bars. Since the timing of the threads is the same in the different distributors, no alteration in the timing of the matrix-lifting fingers for the different distributors is necessary.

I claim as my invention:—

1. In matrix distributing mechanism for typographical machines embodying a plurality of distributors having conveyer screws for advancing the matrices therein, a conveyer screw common to said distributors and having a plurality of matrix-engaging threads positioned thereon to correspond respectively with those of the conveyer screws of said distributors.

2. In matrix distributing mechanism for typographical machines embodying a plurality of distributors having conveyer screws each provided with a single thread for engaging and advancing the matrices therein, a conveyer screw common to said distributors and having a plurality of matrix-engaging threads positioned thereon to correspond respectively with the single threads of the conveyer screws of said distributors.

3. In matrix distributing mechanism for typographical machines embodying a plurality of distributors having conveyer screws for advancing the matrices therein, and matrix lifters movable in unison for engaging the matrices with the screws in said distributors, a conveyer screw common to said distributors and having a plurality of matrix-engaging threads positioned thereon in timed relation respectively with said lifters.

4. In matrix distributing mechanism for typographical machines embodying a plurality of distributors to receive matrices belonging to different fonts, a conveyer screw common to said distributors and having a plurality of matrix-engaging threads thereon to cooperate respectively with the different font matrices.

5. In matrix distributing mechanism for typographical machines embodying a plurality of distributors having conveyer screws for advancing the matrices therein, a conveyer screw common to said distributors and having a plurality of threads thereon to engage matrices at different sides thereof, one of said threads having its matrix-engaging side bevelled in a direction radially of its axis.

6. Matrix distributing mechanism for typographical machines embodying a pair of distributors arranged one next to the other and having conveyer screws revoluble at the same speed for advancing the matrices therein, one of said screws being common to both of said distributors and having a plurality of threads thereon of the same pitch as those of the other screws to respectively engage at the opposite sides of said common screw matrices in the different distributors.

In testimony whereof I have hereunto set my hand.

RANSOM H. TURNER.